United States Patent

Kaneko et al.

Patent Number: 5,866,033
Date of Patent: Feb. 2, 1999

[54] LIQUID CRYSTAL COMPOSITION AND LIQUID CRYSTAL DISPLAY DEVICE

[75] Inventors: Masaharu Kaneko; Masami Kadowaki; Hideki Sato, all of Yokohama, Japan

[73] Assignee: Mitsubishi Chemical Corporation, Tokyo, Japan

[21] Appl. No.: 946,859

[22] Filed: Oct. 8, 1997

[30] Foreign Application Priority Data

Oct. 21, 1996 [JP] Japan .................................... 8-277789
Feb. 12, 1997 [JP] Japan .................................... 9-27684
Mar. 28, 1997 [JP] Japan .................................... 9-77234

[51] Int. Cl.$^6$ ............................ C09K 19/60; C09K 19/22
[52] U.S. Cl. .................................... 252/299.1; 252/299.68
[58] Field of Search ........................... 252/299.01, 299.1, 252/299.62, 299.68

[56] References Cited

FOREIGN PATENT DOCUMENTS 5-98259   4/1993   Japan .
5-320652  12/1993  Japan .

OTHER PUBLICATIONS

CA 110: 194633, 1988.
Yasui et al., "Synthesis and Some Properties of Deep Colored Dichroic Polyazodyes", Shikizai Kyokaishi 61(12), pp. 678–684, 1988.

Primary Examiner—Shean C. Wu
Attorney, Agent, or Firm—Oblon, Spivak, McClelland, Maier & Neustadt, P.C.

[57] ABSTRACT

A guest host mode liquid crystal composition comprising dichroic dyes and host liquid crystal, wherein said dichroic dyes are at least one member selected from each of the following groups (A), (B) and (C):

Group (A) consisting of azo dichroic dyes of the following formula (I):

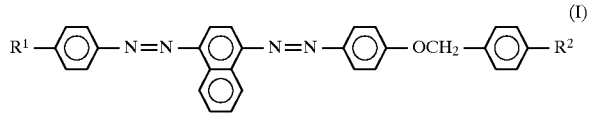

wherein each of $R^1$ and $R^2$ which are independent of each other, is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent;

Group (B) consisting of azo dichroic dyes of the following formula (II):

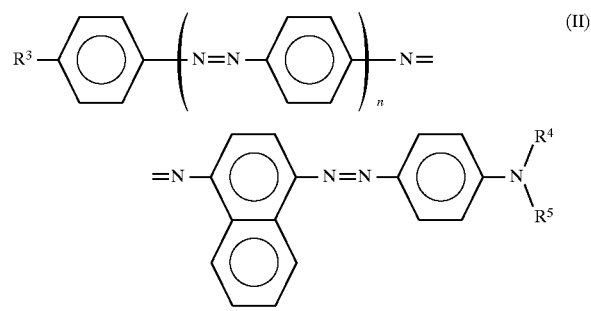

wherein n is 0 or 1, $R^3$ is $R^1$ and each of $R^4$ and $R^5$ which are independent of each other, is a hydrogen atom, a $C_{1-10}$ alkyl, alkoxy or halogenated alkyl group, a $C_{2-12}$ alkoxyalkyl group, a halogen atom, or a benzyl or cyclohexylmethyl group which may be substituted as $R^1$; and Group (C) consisting of anthraquinone dichroic dyes of the following formula (III):

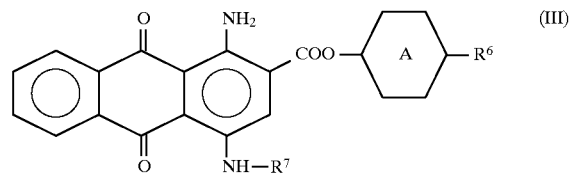

wherein

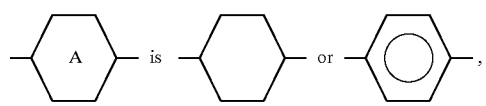

each of $R^6$ and $R^7$ which are independent of each other, is a hydrogen atom, a halogen atom, a $C_{1-10}$ alkyl or alkoxy group, a $C_{2-12}$ alkoxyalkyl group, or a cyclohexyl or phenyl group which may be substituted as $R^1$.

11 Claims, 4 Drawing Sheets

LIQUID CRYSTAL COMPOSITION AND LIQUID CRYSTAL DISPLAY DEVICE

BACKGROUND OF THE INVENTION

1. Field of the Invention

The present invention relates to a liquid crystal composition useful for e.g. a display device, and a liquid crystal display device employing such a composition.

2. Discussion of Background

A liquid crystal device employing a guest host mode liquid crystal composition having a dichroic dye mixed to a host liquid crystal composition, is excellent in brightness or in the viewing angle, and thus is expected to be useful as a liquid crystal device for reflection type display to be used for portable data equipments.

The display quality such as the contrast of such a guest host mode liquid crystal device interrelates directly with the dichroism or the order parameter of the guest host mode liquid crystal composition to be used. Accordingly, a guest host mode liquid crystal composition which exhibits a high order parameter, has heretofore been desired. Especially, recently, a guest host mode liquid crystal composition which employs a new host liquid crystal composition of e.g. fluorine-type and which exhibits a high order parameter, has been desired, which is useful for active matrix addressing LCD.

In an active matrix addressing liquid display device employing e.g. a thin film transistor, the liquid crystal material is required to maintain stored charges for frame time. Accordingly, as such a liquid crystal material, it is essential to employ a material which has a high ability to maintain stored charges for frame time, i.e. a high holding-voltage ratio.

Most of such liquid crystal display devices are transmission type devices employing backlight. However, Personal Digital Assistant (PDA) which has been actively developed in recent years, is required to be driven for a long period of time with a limited battery, and its parts are required to have low power consumption. As a display device, preferred is a reflection type device of low power consumption type requiring no back light. Particularly effective is a guest host liquid crystal composition employing a dichroic dye, since its light utilization efficiency is high.

As such a liquid crystal material, instead of a conventional liquid crystal material containing cyano groups, it has been common to employ a fluorine-type liquid crystal material containing fluorine atoms or substituents containing fluorine atoms, such as fluoromethyl groups such as trifluoromethyl groups, or fluoromethoxy groups such as trifluoromethoxy groups, which usually scarcely contains ionic impurities. However, when a dichroic dye is added to such a liquid crystal material, it often happens that the holding-voltage ratio of the host liquid crystal is substantially impaired. A display intended to be used outdoors, such as Personal Digital Assistant, is required to have high electrical performance such as holding-voltage ratio, particularly with respect to durability against light such as direct sunlight. However, such a liquid crystal material having a dichroic dye incorporated, has a problem that there is a substantial decrease in the holding-voltage ratio after an irradiation test employing a xenon lamp or the like as the power source. For these reasons, it has been difficult to practically develop an active matrix addressing liquid crystal display device employing such as guest host liquid crystal composition.

Specifically, common azo dyes generally exhibit high order parameters, but they are inferior in stability against light as compared with anthraquinone dichroic dyes and thus have had a problem such as a decrease in the voltage-maintaining performance by exposure to light. Anthraquinone dyes are superior to azo dyes in their electrical characteristics to light, but the order parameters of the individual dyes tend to be inferior to azo dyes. Further, in a case where a composition having a black, brown or dark blue color is prepared by mixing a plurality of dyes of such azo and anthraquinone types, the order parameters of the individual dyes decrease in light absorption wavelength regions departing from the respective maximum absorption wavelength ($\lambda$max). Accordingly, with the above composition having a color of black or the like, prepared by mixing dichroic dyes having various structures, the order parameter decreases in a wavelength region where light absorption spectra of the respective dichroic dyes overlap, whereby no adequate contrast of the entire guest host mode liquid crystal composition has been obtained.

For the above-mentioned reasons, it has been desired to practically realize a guest host mode liquid crystal composition and a liquid crystal display device showing a high order parameter and high light stability.

SUMMARY OF THE INVENTION

It is an object of the present invention to provide a guest host most liquid crystal composition and a liquid crystal display device showing a high order parameter and high light stability, when the guest host mode liquid crystal composition having a color such as black, brown or dark blue, is used for a monocolor display excellent in visibility or for a multicolor display of multicolors or full color in combination with e.g. a microcolor filter.

The present inventors have conducted extensive studies to solve the above-mentioned problems such as a decrease in contrast and light stability with respect to a guest host liquid crystal composition obtained by mixing a plurality of dichroic dyes, and as a result, have found that a guest host mode liquid crystal composition obtained by a combination of specific dichroic dyes, has an excellent order parameter over the entire light absorption region, and it is excellent in stability such as light resistance. The present invention has been accomplished on the basis of this discovery.

That is, the present invention provides a guest host mode liquid crystal composition comprising dichroic dyes and host liquid crystal, wherein said dichroic dyes are at least one member selected from each of the following groups (A), (B) and (C):

Group (A) consisting of azo dichroic dyes of the following formula (I):

(I)

wherein each of $R^1$ and $R^2$ which are independent of each other, is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent;

Group (B) consisting of azo dichroic dyes of the following formula (II):

wherein n is 0 or 1, $R^3$ is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent, and each of $R^4$ and $R^5$ which are independent of each other, is a hydrogen atom, a $C_{1-10}$ alkyl, alkoxy or halogenated alkyl group, a $C_{2-12}$ alkoxyalkyl group, a halogen atom, or a benzyl or cyclohexylmethyl group which may be substituted by an alkyl group, an alkoxy group, an alkoxyalkyl group or a halogen atom;

Group (C) consisting of anthraquinone dichroic dyes of the following formula (III):

wherein each of $R^6$ and $R^7$ which are independent of each other, is a hydrogen atom, a halogen atom, a $C_{1-10}$ alkyl or alkoxy group, a $C_{2-12}$ alkoxyalkyl group, or a cyclohexyl or phenyl group which may have such a halogen atom or an alkyl, alkoxy or alkoxyalkyl group, as a substituent. Further, the present invention provides a liquid crystal display device employing such a liquid crystal composition.

DETAILED DESCRIPTION OF THE PREFERRED EMBODIMENTS

Now, the present invention will be described in further detail.

The liquid crystal composition of the present invention is one having a color such as black, dark blue or brown, and dyes employed in the present invention provide the effect of the invention by the combination of the dichroic dyes represented by the above-mentioned groups. The dyes of such groups are respectively known. The dyes of the above formula (I) are disclosed, for example, in JP-A-58-138767, and the dyes of the above formula (III) are disclosed, for example, in JP-A-59-4650. The dyes of the above formula (II) are disclosed in JP-A-63-301850 and are commercially sold by Nippon Kanko Shikiso K.K.

Now, the respective groups of dyes to be used in the present invention, will be described in detail.

In the above formula (I), each of $R^1$ and $R^2$ which are independent of each other, is usually a hydrogen atom; a linear or branched $C_{1-10}$ alkyl group such as a methyl group, an ethyl group, a n-propyl group, an i-propyl group, a n-butyl group, an i-butyl group, a pentyl group, a hexyl group, a heptyl group, an octyl group, a nonyl group or a decyl group; a linear or branched $C_{2-12}$ alkoxyalkyl group such as a methoxymethyl group, a methoxyethyl group, a methoxy-n-butyl group, an ethoxymethyl group, a n-butoxymethyl group, an i-butoxymethyl group, an ethoxyethyl group, a n-butoxyethyl group or an i-butoxyethyl group; a linear or branched $C_{1-10}$ alkoxy group such as a methoxy group, an ethoxy group, a n-propoxy group, an i-propoxy group, a n-butoxy group, an i-butoxy group, a pentoxy group or an octoxy group; a halogen atom such as a fluorine atom, a chlorine atom or a bromine atom; or a cyclohexyl, phenyl, benzyl or cyclohexylmethyl group which may have such an alkyl, alkoxy or alkoxyalkyl group or a halogen atom, as a substituent. As $R^1$ and $R^2$, preferred is a hydrogen atom, an alkyl group, an alkoxyalkyl group or an alkoxy group, and more preferred is a hydrogen atom or a linear or branched $C_{1-10}$ alkyl group.

In the above formula (II), $R^3$ is a hydrogen atom; a linear or branched $C_{1-10}$ alkyl group such as a methyl group, an ethyl group, a n-propyl group, an i-propyl group, a n-butyl group, an i-butyl group, a pentyl group, a hexyl group, a heptyl group, an octyl group, a nonyl group or a decyl group; a linear or branched $C_{1-10}$ alkoxy group such as a methoxy group, an ethoxy group, a n-propoxy group, an i-propoxy group, a n-butoxy group, an i-butoxy group, a pentoxy group or an octoxy group; a linear or branched $C_{2-12}$ alkoxyalkyl group such as a methoxymethyl group, a methoxyethyl group, a methoxy-n-butyl group, an ethoxymethyl group, a n-butoxymethyl group, an i-butoxymethyl group, a methoxypropyl group, an ethoxyethyl group or a butoxyethyl group; a halogen atom such as a fluorine atom, a chlorine atom or a bromine atom; or a cyclohexyl, phenyl, benzyl or cyclohexylmethyl group which may have such an alkyl, alkoxy or alkoxyalkyl group or a halogen atom, as a substituent, and each of $R^4$ and $R^5$ which are independent of each other, is a hydrogen atom; a linear or branched $C_{1-10}$ alkyl group such as a methyl group, an ethyl group, a n-propyl group, a butyl group, a pentyl group, a hexyl group, an octyl group, a nonyl group or a decyl group; a linear or branched $C_{1-10}$ alkoxy group such as a methoxy group, an ethoxy group, a n-propoxy group, an i-propoxy group, a n-butoxy group, an i-butoxy group, a pentoxy group or an octoxy group; a $C_{1-10}$ halogenated alkyl group substituted by fluorine atoms, such as a nonafluorohexyl group or a pentafluoropropyl group; a linear or branched $C_{2-12}$ alkoxyalkyl group such as a methoxymethyl group, a methoxyethyl group, a methoxy-n-butyl group, an ethoxymethyl group, a n-butoxymethyl group, an i-butoxymethyl group, a methoxypropyl group, an ethoxyethyl group, a n-butoxyethyl group or an i-butoxyethyl group; a a halogen atom such as a fluorine atom, a chlorine atom or a bromine atom; or a cyclohexylmethyl or benzyl group which may have such an alkyl, alkoxyalkyl or alkoxy group or a halogen atom, as a substituent.

$R^3$ is preferably a hydrogen atom or a linear or branched $C_{1-10}$ alkyl group.

As $R^4$ and $R^5$, preferred is a $C_{1-10}$ halogenated alkyl group.

In the above formula (III), each of $R^6$ and $R^7$ which are independent of each other, is a hydrogen atom; a linear or branched $C_{1-10}$ alkyl group such as a methyl group, an ethyl group, a n-propyl group, an i-propyl group, a n-butyl group, an i-butyl group, a pentyl group, a hexyl group, a heptyl group, an octyl group, a nonyl group or a decyl group; a linear or branched $C_{2-12}$ alkoxyalkyl group such as a methoxymethyl group, a methoxyethyl group, a methoxy-n-butyl group, an ethoxymethyl group, a n-butoxymethyl group, an i-butoxymethyl group, a methoxypropyl group, an ethoxyethyl group, a n-butoxyethyl group or an i-butoxyethyl group; a linear or branched $C_{1-10}$ alkoxy group such as a methoxy group, an ethoxy group, a n-propoxy group, an i-propoxy group, a n-butoxy group, an i-butoxy group, a pentoxy group or an octoxy group; a halogen atom such as a fluorine atom, a chlorine atom or a bromine atom; or a cyclohexyl or phenyl group which may have such a halogen atom or an alkyl, alkoxy or alkoxyalkyl group, as a substituent.

As $R^6$ and $R^7$, preferred is a phenyl group substituted by a linear or branched $C_{1-10}$ alkyl group.

When is $R^6$ is preferably a linear or branched $C_{1-10}$ alkyl group. When

$R^6$ is preferably a cyclohexyl group substituted by a linear or branched $C_{1-10}$ alkyl group.

As the dichroic dyes of the present invention, at least one dye selected from each of the above groups (A), (B) and (C), is used. However, it is preferred to employ at least one dye of the above formula (II) wherein n is 0, among dyes of group (B). It is particularly preferred to employ at least one dye of the formula (II) wherein n is 0 and at least one dye of the formula (II) wherein n is 1, from the viewpoint of the color tone. Further, $R^4$ or $R^5$ is more preferably a halogenated alkyl group or a halogenated alkoxyalkyl group from the viewpoint of the stability such as light resistance. Further, it is preferred to employ at least two dyes among dyes of group (C).

Specific examples of dichroic dyes of the respective groups to be used in the present invention, will be given in the following Table 1.

TABLE 1

Group (A)

| Formula | $R^1$ | $R^2$ |
|---|---|---|
| I-1 | $(n)H_{17}C_8-$ | $-OC_7H_{15}(n)$ |
| I-2 | $(n)H_{17}C_8-$ | $-OC_5H_{11}(n)$ |
| I-3 | $(n)H_{17}C_8-$ | H |
| I-4 | $(n)H_9C_4-$ | $-OC_4H_9(n)$ |

TABLE 1-continued

Group (B)

$$R^3-\text{C}_6\text{H}_4-(\text{N=N}-\text{C}_6\text{H}_4)_n-\text{N=N}-\text{(naphthalene)}-\text{N=N}-\text{C}_6\text{H}_4-\text{NR}^4\text{R}^5$$

| Formula | n | R³ | R⁴ | R⁵ |
|---------|---|------|------|------|
| II-1 | 1 | C₄H₉(n)— | —C₂H₅ | —C₂H₅ |
| II-2 | 1 | C₈H₁₇(n)— | —C₂H₅ | —C₂H₅ |
| II-3 | 1 | C₄H₉(n)— | —C₃H₇(n) | —C₃H₇(n) |
| II-4 | 1 | C₄H₉O(n)— | H | —C₃H₇(n) |
| II-5 | 1 | C₄H₉(n)— | —CH₃ | —C₂H₄C₄F₉ |
| II-6 | 1 | C₄H₉(n)— | —CH₃ | —C₂H₄OC₂H₅ |
| II-7 | 0 | C₄H₉(n)— | —CH₃ | —CH₃ |
| II-8 | 0 | C₈H₁₇(n)— | —CH₃ | —CH₃ |
| II-9 | 0 | C₄H₉(n)— | —C₂H₅ | —C₂H₅ |
| II-10 | 1 | C₈H₁₇(n)— | —CH₃ | —C₂H₄C₄F₉(n) |
| II-11 | 1 | C₄H₉(n)— | —C₂H₅ | —C₂H₄C₆F₁₃(n) |
| II-12 | 1 | C₄H₉(n)— | —CH₃ | —CH₂C₂F₅ |
| II-13 | 1 | C₈H₁₇(n)— | —C₂H₅ | —CH₂—(CF₂)₂—H |

Group (C)

1-amino-4-(NHR⁷)-anthraquinone-2-COO-A-R⁶

| Formula | R⁶ | R⁷ | A |
|---------|-----|-----|---|
| III-1 | cyclohexyl-C₃H₇(n) | phenyl-C₄H₉(n) | cyclohexyl |
| III-2 | cyclohexyl-C₅H₁₁(n) | phenyl-C₄H₉(n) | phenyl |
| III-3 | —C₄H₉(n) | H | phenyl |
| III-4 | —C₆H₁₃(n) | H | phenyl |
| III-5 | —C₈H₁₇(n) | H | phenyl |
| III-6 | —C₄H₉(n) | —C₄H₉(n) | phenyl |

TABLE 1-continued

| | | | |
|---|---|---|---|
| III-7 | H | ⟨phenyl⟩–C₄H₉ (n) | ⟨cyclohexyl⟩ |
| III-8 | H | ⟨phenyl⟩–C₆H₁₃ (n) | ⟨cyclohexyl⟩ |
| III-9 | –C₄H₉(n) | ⟨phenyl⟩–C₄H₉ (n) | ⟨cyclohexyl⟩ |
| III-10 | –C₄H₉(n) | ⟨phenyl⟩–C₈H₁₇ (n) | ⟨cyclohexyl⟩ |
| III-11 | –C₈H₁₇(n) | ⟨phenyl⟩–C₄H₉ (n) | ⟨cyclohexyl⟩ |
| III-12 | –C₈H₁₇(n) | ⟨phenyl⟩–C₈H₁₇ (n) | ⟨cyclohexyl⟩ |

The amounts of the dyes of the respective groups (A), (B) and (C) are suitably selected depending upon the desired color. For example, in order to obtain a liquid crystal composition having a color such as black, brown or dark blue, it is preferred to use from 0.02 to 2.7 wt % of the dye of group (A), from 0.02 to 2.7 wt % of the dye of group (B) and from 0.06 to 9.6 wt % of the dye of group (C), based on the host liquid crystal material, and the total content of the dichroic dyes is usually from 0.1 to 15 wt %, preferably from 0.5 to 5 wt %, based on the host liquid crystal material.

In the present invention, it is preferred to further incorporate at least one dye selected from the following group (D) in addition to the dyes of groups (A) to (C), with a view to improvement of the reliability of e.g. heat resistance and light resistance. The dyes of the following formula (IV) of group (D) are disclosed in JP-A-59-179561.

Group (D) consisting of anthraquinone dichroic dyes of the following formula (IV):

wherein each of $R^8$ and $R^9$ which are independent of each other, is a hydrogen atom, a halogen atom, a $C_{1-10}$ alkyl or alkoxy group, a $C_{2-12}$ alkoxyalkyl group, or a cyclohexyl or phenyl group which may have such a halogen atom or an alkyl, alkoxy or alkoxyalkyl group, as a substituent.

In the above formula (IV), each of $R^8$ and $R^9$ which are independent of each other, is a hydrogen atom; a linear or branched $C_{1-10}$ alkyl group such as a methyl group, an ethyl group, a n-propyl group, an i-propyl group, a n-butyl group, an i-butyl group, a pentyl group, a hexyl group, a heptyl group, an octyl group, a nonyl group or a decyl group; a linear or branched $C_{2-12}$ alkoxyalkyl group such as a methoxymethyl group, a methoxyethyl group, a methoxy-n-butyl group, an ethoxymethyl group, a n-butoxymethyl group, an i-butoxymethyl group, a methoxypropyl group, an ethoxyethyl group, a n-butoxyethyl group or an i-butoxyethyl group; a linear or branched $C_{1-10}$ alkoxy group such as a methoxy group, an ethoxy group, a n-propoxy group, an i-propoxy group, a n-butoxy group, an i-butoxy group, a pentoxy group or an octoxy group; a halogen atom such as a fluorine atom, a chlorine atom or a bromine atom; or a cyclohexyl or a phenyl group which may have such a halogen atom or an alkyl, alkoxy or alkoxyalkyl group, as a substituent.

As $R^8$ and $R^9$, preferred is a linear or branched $C_{1-10}$ alkyl group.

Specifically, those identified in the following Table 2 may be mentioned.

TABLE 2

Group (D)

| Formula | $R^8$ | $R^9$ |
|---------|-------|-------|
| IV-1 | (n)H₁₃C₅— | —CH₃ |
| IV-2 | (n)H₁₇C₈— | —CH₃ |
| IV-3 | (n)H₉C₄— | —CH₃ |

The amounts of the dyes of the respective groups (A), (B), (C) and (D) are suitably selected depending upon the desired color. To obtain a composition having a color such as black, brown or dark blue, it is preferred to use from 0.01 to 1.8 wt % of the dye of group (A), from 0.01 to 1.3 wt % of the dye of group (B), from 0.05 to 7.7 wt % of the dye of group (C) and from 0.03 to 4.2 wt % of the dye of group (D), based on the host liquid crystal material. The total amount of the dichroic dyes is usually from 0.1 to 15 wt %, preferably from 0.5 to 8 wt %, based on the host liquid crystal material.

The host liquid crystal material to be used in the present invention may, for example, be a fluorine-type liquid crystal material comprising, as the main component, a liquid crystal compound of the formula (V), a Nn type liquid crystal material comprising, as the main component, a liquid crystal compound of the formula (VI) or (VII), or a cyano type liquid crystal material comprising, as the main component, a liquid crystal compound of the formula (VIII) or (IX), as identified in the following Table 3.

TABLE 3

| Formula | | |
|---|---|---|
| V | (structure) | Fluorine-type Np liquid crystal material |
| VI | (structure) | Fluorine-type Nn liquid crystal material |
| VII |  | Cyano-type Nn liquid crystal material |
| VIII | (structure) | Cyano-type Np liquid crystal material |
| IX | (structure) | Cyano-type Np liquid crystal material |

In the above formulas, $-\!\!\!\!\bigcirc\!\!\!\!-$ B $-\!\!\!\!\bigcirc\!\!\!\!-$ represents a cyclohexane ring, a benzene ring, a silacyclohexane ring, a dioxane ring or a pyrimidine ring, and n is an integer of from 1 to 3. -Z- represents a single bond, -COO-, -CH₂CH₂-, -CH=CH- or -C≡C-. Each of $Y^1$ and $Y^3$ which are independent of each other, is a hydrogen atom; or a halogen atom such as a fluorine atom or a chlorine atom, $Y^2$ is a halogen atom such as a fluorine atom or a chlorine atom; a $C_{1-7}$ substituted alkyl, substituted alkoxy or substituted alkenyl group which has a halogen atom such as a fluorine atom or a chlorine atom, as the substituent; or a substituted cyclohexyl or substituted phenyl group which has a substituted alkyl, substituted alkoxy or substituted alkenyl group, as a substituent. Here, among $Y^1$ to $Y^3$, at least one is a fluorine atom (in the case of $Y^2$, a fluorine atom or an alkyl or alkoxy group which has a fluorine atom as a substituent). At least one of $Y^7$ to $Y^8$ is a fluorine atom, and the other is a hydrogen atom, or a halogen atom such as a fluorine atom or a chlorine atom.

Each of $Y^{11}$ and $Y^{13}$ is a cyano group, or a $C_{1-10}$ alkyl, alkoxy, alkoxyalkyl or alkenyl group. Each of $Y^4$ to $Y^6$, $Y^9$ to $Y^{10}$, $Y^{12}$ and $Y^{14}$ which are independent of one another, is a $C_{1-10}$ alkyl, alkoxy or alkenyl group; a $C_{2-11}$ alkoxyalkyl group; or a $C_{1-7}$ substituted alkyl, substituted alkoxy or substituted alkenyl group which has a halogen atom such as a fluorine atom or a chlorine atom, as a substituent.

The liquid crystal compounds of the above formulas (V), (VIII) and (IX) usually have positive dielectric anisotropy. Known liquid crystals having negative dielectric anisotropy such as those of the above formulas (VI) and (VII) may be mixed with liquid crystals having positive dielectric anisotropy, so that the mixture as a whole is useful as a positive liquid crystal material.

To the guest host liquid crystal composition of the present invention, various ultraviolet ray absorbers or anti-oxidants, a steroid type liquid crystal such as a cholesteric nanoate as a chiral dopant, and a chiral nematic liquid crystal having an optically active alkyl group or an optically active alkoxy group introduced to a terminal group of a liquid crystal compound described above as a host liquid crystal material, may be added in an amount of up to from 0.1 to 10%.

The guest host mode liquid crystal composition of the present invention can readily be prepared by mixing and dissolving the host liquid crystal material, the dichroic dyes and various additives by an operation such as shaking.

The guest host mode liquid crystal composition thus prepared, may be interposed between electrode substrates, of which at least one is transparent, which have been treated to obtain an electrooptical effect such as a TN mode, a STN mode or various guest host modes such as a Heilmeier type guest host as disclosed in e.g. "Liquid Crystal Device Handbook" compiled by the 142 committee of Nippon Gakujitsu Shinkokai and published by Nippon Kogyo Shinbunsha (1989), p.315–329 and p.367–370, and combined with various direct driving systems as disclosed in e.g. "Liquid Crystal Device Handbook" compiled by the 142 committee of Nippon Gakujitsu Shinkokai and published by Nippon Kogyo Shinbunsha (1989), p.387–434 or with an active driving system by an active element such as a thin film transistor or MIM, to obtain various display devices.

Thus, in the present invention, various modes of liquid crystal display devices can be used. However, a phase transition mode obtainable by adding an optically active substance to a nematic liquid crystal composition, is particularly preferred as a reflection type liquid crystal display device, since the display will be bright, as a polarizing plate which is usually employed, will not be required.

Figure 7:
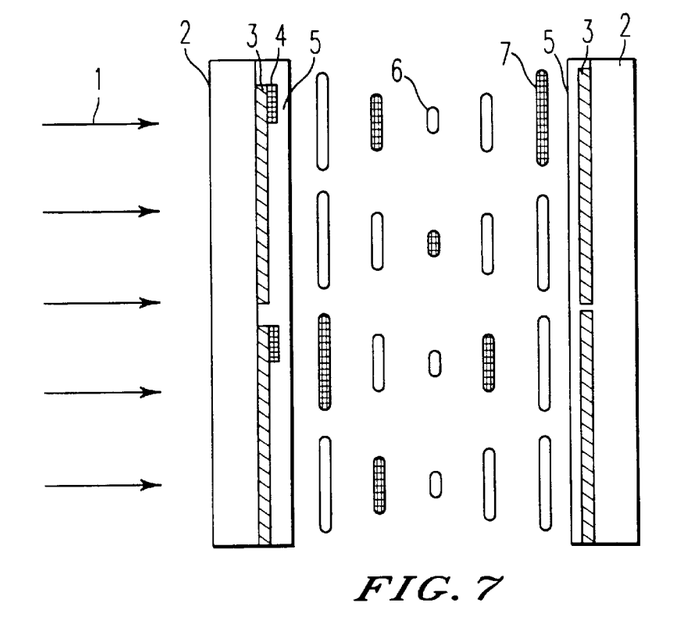
FIG. 7 is a schematic cross-sectional view of a reflection type liquid crystal display device of phase transition mode in its off state, as an example of the liquid crystal display device of the present invention.
Figure 8:
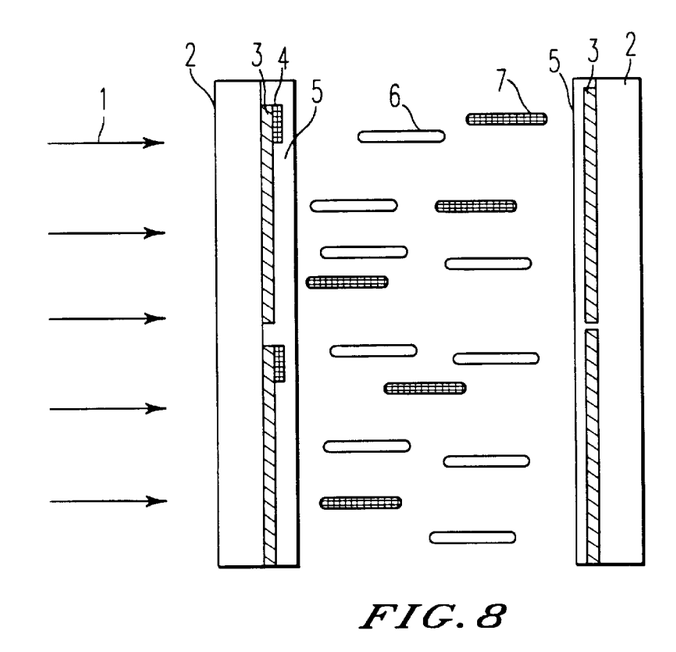
FIG. 8 is a schematic cross-sectional view of a reflection type liquid crystal display device of phase transition mode in its on state, as an example of the liquid crystal display device of the present invention.

As an example of the liquid crystal display device of the present invention, FIGS. 7 and 8 show schematic cross-sectional views of a guest host mode liquid crystal display device of phase transition mode with an active driving system. FIG. 7 shows an off-state, i.e. a no voltage-applied state, of the liquid crystal device, and FIG. 8 shows an on-state, i.e. a voltage-applied state. In the Figures, reference numeral 1 indicates an incident light, numeral 2 a transparent glass plate, numeral 3 a transparent electrode, numeral 4 an active element, numeral 5 an alignment layer, numeral 6 a liquid crystal compound, and numeral 7 dichroic dyes.

In the off-state (FIG. 7), the liquid crystal compound 6 exhibits a cholesteric phase. The dichroic dyes 7 also exhibit a cholesteric structure together with the liquid crystal compound 6, whereby the incident light 1 which may be natural light, will be absorbed by the dyes 7 without necessity to use a polarizing plate. When a voltage is applied (FIG. 8), the liquid crystal compound 6 and the dichroic dyes 7 will align in the direction of the electric field, whereby the light will pass through.

Thus, with the liquid crystal display device, the transmission and absorption of light can be controlled by the presence or absence of an electric field.

Now, the present invention will be described in further detail with reference to Examples. However, it should be understood that the present invention is by no means restricted to such specific Examples.

EXAMPLE 1

Dichroic dyes of the following formulae as identified in the above Table 1 were mixed and dissolved in 100 g of a liquid crystal mixture comprising, as the main component, a fluorine-type compound commercially available under a tradename ZLI-4792 (manufactured by E. MERCK) to obtain a liquid crystal composition I.

[I-3] 0.68 g
[II-1] 0.63 g
[III-9] 0.84 g
[III-10] 0.92 g

This liquid crystal composition I was injected into a cell composed of glass plates provided with transparent electrodes, treated for homogeneous alignment by rubbing after coating and curing a polyimide resin and disposed so that the alignment treated sides faced each other to be antiparallel. To this cell, polarized lights parallel and vertical to the rubbing direction were irradiated, whereby the respective transmitted light spectra (A parallel and A vertical) were measured. By using these measured values, the order parameter was calculated by the following formula.

Order parameter (S-value)=(A parallel−A vertical)/(A parallel+2×A vertical)

In Table 4, the order parameters at the respective wavelengths are shown.

TABLE 4

| Wavelength (nm) | 450 | 500 | 550 | 600 |
| --- | --- | --- | --- | --- |
| S-value | 0.75 | 0.81 | 0.80 | 0.78 |

Figure 1:
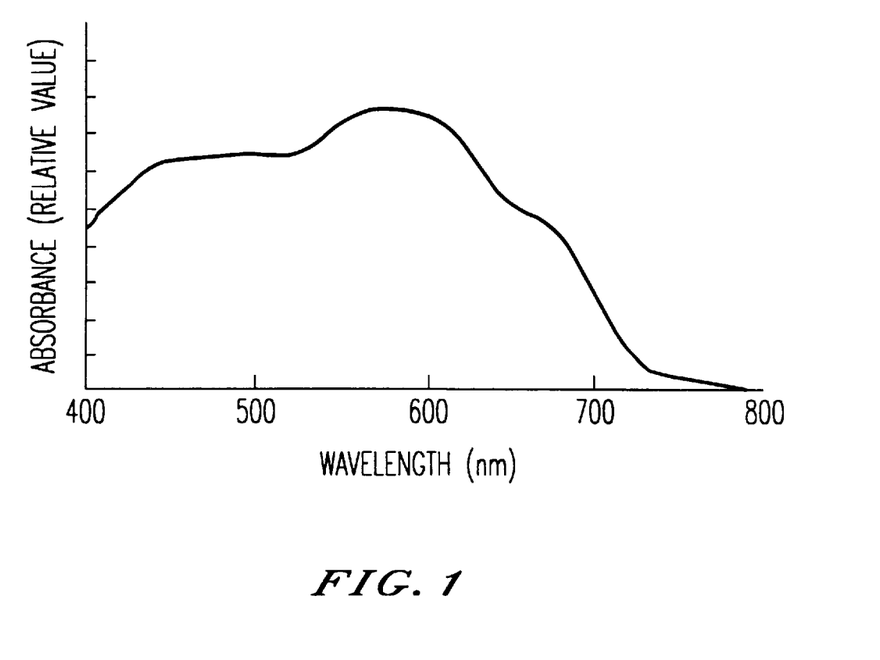
FIG. 1 is a chart of A parallel relative absorption spectrum of liquid crystal composition I (Example 1) of the present invention.

Further, a chart of the relative absorption spectrum of A parallel is shown in FIG. 1.

Then, a sharp cut filter made of triacetylcellulose having a transmission limiting wavelength of 380 nm was disposed on the cell surface to obtain a guest host mode liquid crystal device I. The holding-voltage ratio of this liquid crystal device I before and after irradiation for 120 hours (accumulated irradiance: 138 MJ/m$^2$) by a xenon fade meter were measured under the following conditions, whereby it was 99% before the irradiation and 98% after the irradiation, thus showing excellent light resistance.

The conditions for measuring the holding-voltage ratio

Frame frequency: 33 Hz
Applied voltage; 5 V
ON period: 60 μsec
Measuring temperature: 25° C.

EXAMPLE 2

Dichroic dyes of the following formulae as identified in Table 1 were mixed and dissolved in 100 g of a liquid crystal mixture comprising, as the main component, a fluorine-type compound commercially available under a tradename ZLI-4792 (manufactured by E. MERCK) to obtain a liquid crystal composition II.

[I-3] 0.63 g
[II-1] 0.45 g
[II-7] 0.17 g
[III-9] 1.00 g
[III-10] 1.10 g

Figure 2:
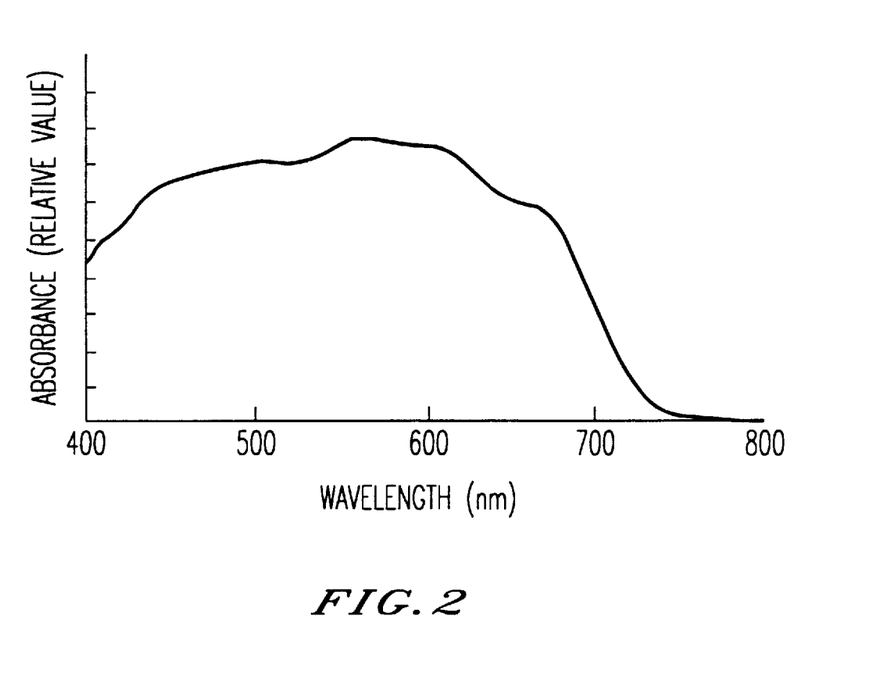
FIG. 2 is a chart of A parallel relative absorption spectrum of liquid crystal composition II (Example 2) of the present invention.

In the same manner as in Example 1, this liquid crystal composition II was injected into a cell, and the order parameters (S-values) and the spectra were measured. The results are shown in Table 5 and FIG. 2.

TABLE 5

| Wavelength (nm) | 450 | 500 | 550 | 600 |
| --- | --- | --- | --- | --- |
| S-value | 0.73 | 0.79 | 0.78 | 0.78 |

Then, in the same manner as in Example 1, a guest host mode liquid crystal device II was prepared, and the voltage-maintaining performance before and after irradiation for 120 hours by a xenon fade mater was measured under the same conditions as in Example 1, whereby it was 99% before the irradiation and 98% after the irradiation, thus indicating excellent light resistance.

EXAMPLE 3

Dichroic dyes of the following formulae as identified in the above Table 1 were mixed and dissolved in 100 g of a liquid crystal mixture comprising, as the main component, a fluorine-type compound commercially available under a tradename ZLI-4792 (manufactured by E. MERCK) to obtain a liquid crystal composition III.

[I-1] 0.29 g
[I-2] 0.28 g
[II-1] 0.35 g
[II-7] 0.25 g
[III-9] 1.20 g
[III-10] 1.32 g

Figure 3:
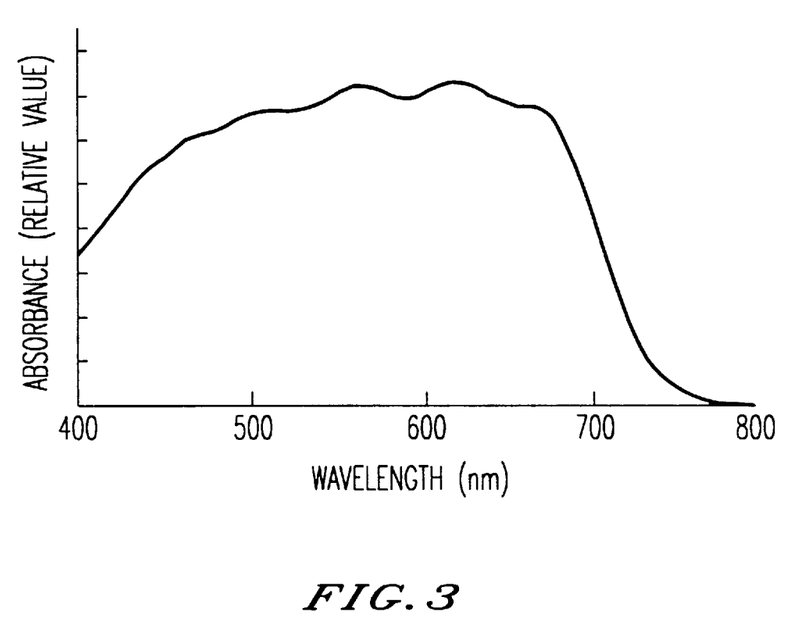
FIG. 3 is a chart of A parallel relative absorption spectrum of liquid crystal composition III (Example 3) of the present invention.

In the same manner as in Example 1, this liquid crystal composition III was injected into a cell, and the order parameters (S-values) and the spectra were measured. The results are shown in Table 6 and FIG. 3.

TABLE 6

| Wavelength (nm) | 450 | 500 | 550 | 600 |
|---|---|---|---|---|
| S-value | 0.72 | 0.77 | 0.77 | 0.76 |

Then, a sharp cut filter made of triacetylcellulose having a transmission limiting wavelength of 380 nm, was disposed on the cell surface to obtain a guest host mode liquid crystal device III. The voltage-maintaining performance of this liquid crystal device III before and after irradiation for 120 hours (accumulated irradiance: 184 MJ/m$^2$) by a xenon fade mater was measured under the following conditions, whereby it was 98% before the irradiation and 92% after the irradiation, thus indicating excellent light resistance.

Conditions for measuring the holding-voltage ratio

Frame frequency: 3.3 Hz
Applied voltage: 5 V
ON period: 60 μsec
Measuring temperature: 25° C.

EXAMPLE 4

Dichroic dyes of the following formulae as identified in the above Table 1 were mixed and dissolved in 100 g of a liquid crystal mixture comprising, as the main component, a fluorine-type compound commercially available under a tradename ZLI-4792 (manufactured by E. MERCK) to obtain a liquid crystal composition IV.

[I-3] 0.57 g
[II-1] 0.37 g
[II-7] 0.23 g
[III-9] 1.16 g
[III-10] 1.27 g

Figure 4:
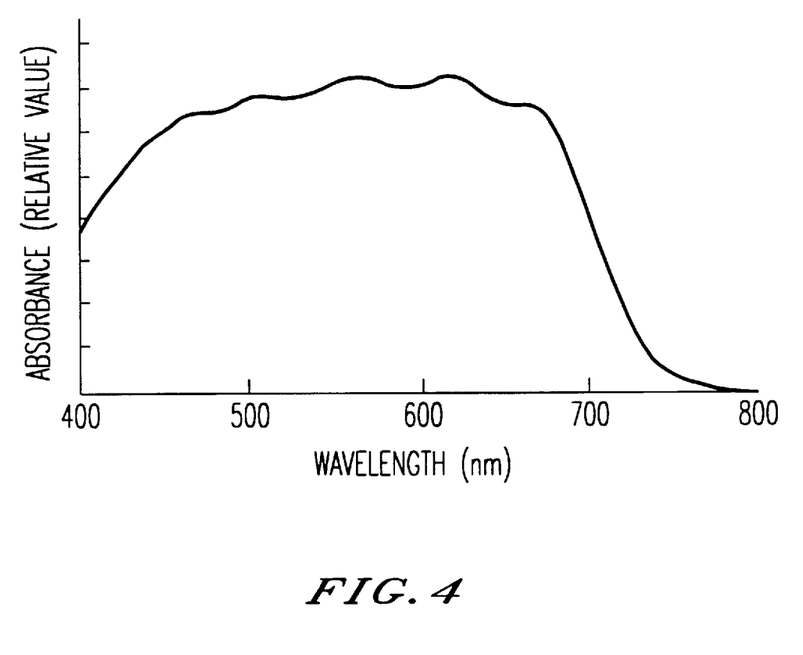
FIG. 4 is a chart of A parallel relative absorption spectrum of liquid crystal composition IV (Example 4) of the present invention.

In the same manner as in Example 1, this liquid crystal composition IV was injected into a cell, and the order parameters (S-values) and the spectra were measured. The results are shown in Table 7 and FIG. 4.

TABLE 7

| Wavelength (nm) | 450 | 500 | 550 | 600 |
|---|---|---|---|---|
| S-value | 0.71 | 0.76 | 0.76 | 0.75 |

Then, in the same manner as in Example 3, a guest host mode liquid crystal device IV was prepared, and the holding-voltage ratio before and after irradiation for 160 hours by a xenon fade mater was measured under the same conditions as in Example 3, whereby it was 98% before the irradiation and 94% after the irradiation, thus indicating excellent light resistance.

EXAMPLE 5

Dichroic dyes of the following formulae as identified in the above Table 1, were mixed and dissolved in 100 g of a liquid crystal mixture comprising, as the main component, a fluorine-type compound commercially available under a tradename ZLI-4792 (manufactured by E. MERCK) to obtain a liquid crystal composition IV.

[I-1] 0.26 g
[I-2] 0.25 g
[II-5] 0.89 g
[III-9] 1.45 g
[III-10] 1.60 g

Figure 5:
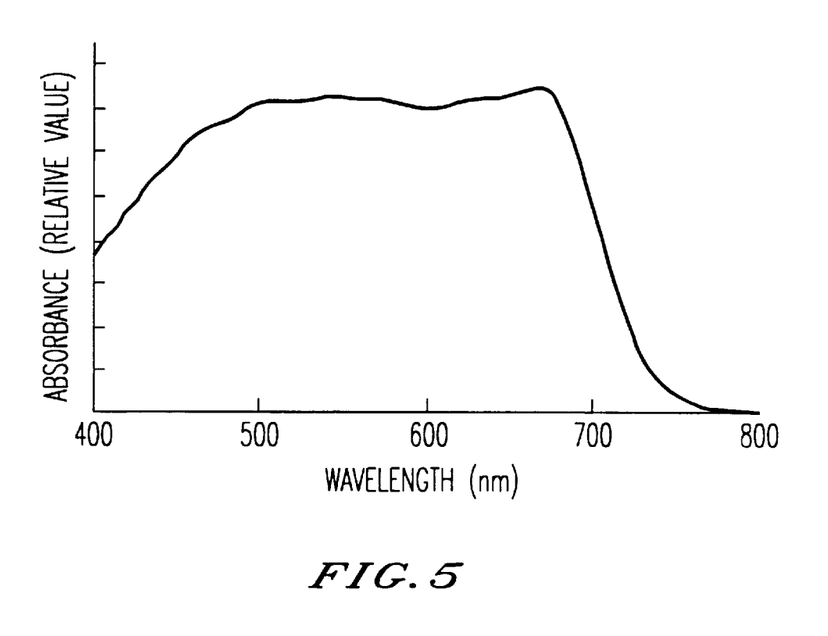
FIG. 5 is a chart of A parallel relative absorption spectrum of liquid crystal composition V (Example 5) of the present invention.

This liquid crystal composition V was injected into a cell composed of glass plates provided with transparent electrodes, treated for homogeneous alignment by rubbing after coating and curing a polyimide resin and disposed so that the alignment treated sides faced each other to be antiparallel. To this cell, a polarized light parallel to the rubbing direction was irradiated, and the transmitted light spectrum was measured. The results are shown in FIG. 5.

Then, a sharp cut filter made of triacetylcellulose having a transmission limiting wavelength of 400 nm, was disposed on the cell surface to obtain a guest host mode liquid crystal device V. The voltage-maintaining performance of this liquid crystal device V before or after irradiation for 160 hours (accumulated irradiance: 184 MJ/m$^2$) by a xenon fade mater and after irradiation for 320 hours (accumulated irradiance: 369 MJ/m$^2$), was measured under the following conditions, whereby it was 96% before the irradiation, 97% after the irradiation for 160 hours and 89% after the irradiation for 320 hours, thus indicating excellent light resistance.

Conditions for measuring the holding-voltage ratio

Frame frequency: 3.3 Hz
Applied voltage: 5 V
ON period: 60 μsec
Measuring temperature: 25° C.

EXAMPLE 6

Dichroic dyes of the following formulae as identified in the above Table 1, were mixed and dissolved in 100 g of a liquid crystal mixture comprising, as the main component, a fluorine-type compound commercially available under a tradename ZLI-4792 (manufactured by E. MERCK) to obtain a liquid crystal composition VI.

[I-1] 0.31 g
[I-2] 0.29 g
[II-6] 0.71 g
[III-9] 1.09 g
[III-10] 1.20 g

Figure 6:
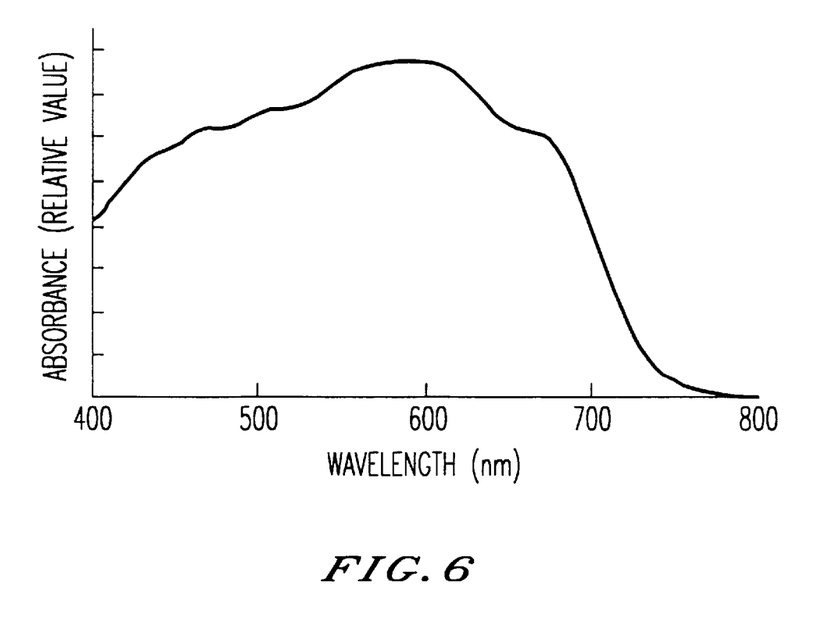
FIG. 6 is a chart of A parallel relative absorption spectrum of liquid crystal composition VI (Example 6) of the present invention.

Using this liquid crystal composition VI, the spectrum was measured in the same manner as in Example 5, and the results are shown in FIG. 6. Then, in the same manner as in Example 5, a guest host mode liquid crystal device VI was prepared, and the holding-voltage ratio of this liquid crystal device VI before and after irradiation for 160 hours and irradiation for 320 hours by a xenon fade meter, was measured under the same conditions as in Example 5, whereby it was 98% before the irradiation, 95% after the irradiation for 160 hours and 74% after the irradiation for 320 hours, thus indicating excellent light resistance.

EXAMPLE 7

Using the liquid crystal composition VII as disclosed in Example 3, a guest host mode liquid crystal device VII was prepared in the same manner as in Example 5. The voltage-maintaining performance before and after irradiation for 160 hours and after irradiation for 320 hours by a xenon fade meter, was measured under the same conditions as in Example 5, whereby it was 99% before the irradiation, 95% after the irradiation for 160 hours and 71% after the irradiation for 320 hours, thus indicating excellent light resistance.

EXAMPLE 8

The following dichroic dyes were dissolved in 100 g of a liquid crystal mixture comprising, as the main component, a fluorine-type compound commercially available under a tradename ZLI-4792 (manufactured by E. MERCK) to obtain a liquid crystal composition VIII.

[I-2] 0.58 g
[II-7] 0.42 g
[III-9] 2.40 g
[IV-2] 1.41 g

This liquid crystal composition VIII was sealed in a cell with a gap of 6 μm, composed of glass plates provided with transparent electrodes, treated for homogeneous alignment by rubbing after coating and curing a polyimide resin and disposed so that the alignment treated sides faced each other, to obtain a liquid crystal display device. The voltage-maintaining performance of this cell was measured by applying a pulse signal with a frame frequency of 30 Hz or 3 Hz under a voltage of 5V for an ON time of 60 μsec at 25° C. (when the frame frequency was 30 Hz, the retention time was 16.7 msec, and when the frame frequency was 3 Hz, the retention time was 167 msec). Further, a sharp cut filter made of triacetylcellulose having a transmission limiting wavelength of 400 nm was disposed on this cell surface, and an irradiation test by a xenon fade meter (irradiation intensity: 320 W/m$^2$) was carried out, whereupon the voltage-maintaining performance was measured. The results are shown in Table 8.

EXAMPLE 9

The following dichroic dyes were dissolved in 100 g of a liquid crystal mixture comprising, as the main component, a fluorine-type compound commercially available under a tradename ZLI-4792 (manufactured by E. MERCK) to obtain a liquid crystal composition IX.

[I-1] 0.30 g
[I-2] 0.29 g
[II-7] 0.42 g
[IV-1] 0.47 g
[IV-2] 0.48 g
[IV-3] 0.43 g
[III-9] 1.20 g
[III-10] 1.32 g

Using this liquid crystal composition IX, a liquid crystal display device was prepared in the same manner as in Example 8, and the voltage-maintaining performance before and after irradiation was measured in the same manner as in Example 8. The results are shown in Table 8.

COMPARATIVE EXAMPLE 1

The following dichroic dyes disclosed in JP-A-6-234975 were dissolved in 100 g of a liquid crystal mixture comprising, as the main component, a fluorine-type compound commercially available under a tradename ZLI-4792 (manufactured by E. MERCK) to obtain a liquid crystal composition X.

[I-2] 0.99 g
[II-1] 0.65 g
[III-9] 2.60 g
Dye of the following formula (X): 0.26 g Using this liquid crystal composition X, a liquid crystal display device was prepared in the same manner as in Example 8, and the voltage-maintaining performance before and after an irradiation test was measured in the same manner as in Example 8. The results are shown in Table 8. As compared with Examples 8 and 9, the voltage-maintaining performance showed a low value after the irradiation test, and the difference between the Examples and the Comparative Example became distinct as the retention time became long.

EXAMPLE 10

The following dichroic dyes were dissolved in 100 g of a liquid crystal mixture comprising, as the main component, a fluorine-type compound commercially available under a tradename ZLI-4792 (manufactured by E. MERCK) to obtain a liquid crystal composition XI.

[I-1] 0.42 g
[I-2] 0.40 g
[II-5] 0.76 g
[III-9] 1.28 g
[III-10] 1.40 g
[IV-1] 0.38 g
[IV-2] 0.39 g

This liquid crystal composition XI was sealed in a cell with a gap of 6 μm, composed of glass plates provided with transparent electrodes, treated for homogeneous alignment by rubbing after coating and curing a polyimide resin and disposed so that the alignment treated sides faced each other, to obtain a liquid crystal display device. The voltage-maintaining performance of this cell was measured by applying a pulse signal with a frame frequency of 3 Hz under a voltage of 5 V for an ON period of 60 μsec at 25° C. (the retention time was 167 msec). Further, a sharp cut filter made of triacetylcellulose having a transmission limiting wavelength of 400 nm was disposed on this cell surface, and an irradiation test by a xenon fade meter (irradiation intensity: 320 W/m²) was carried out, whereupon the voltage-maintaining performance was measured. The results are shown in Table 9.

EXAMPLE 11

The following dichroic dyes were dissolved in 100 g of a liquid crystal mixture comprising, as the main component, a fluorine-type compound commercially available under a tradename ZLI-4792 (manufactured by E. MERCK) to obtain a liquid crystal composition XII.

[I-1] 0.45 g
[I-2] 0.43 g
[II-5] 0.70 g
[III-9] 1.40 g
[III-10] 1.54 g
[IV-1] 0.33 g
[IV-2] 0.33 g

Using this liquid crystal composition XII, a liquid crystal display device was prepared in the same manner as in Example 10, and the voltage-maintaining performance before and after an irradiation test was measured in the same manner as in Example 10. The results are shown in Table 9.

TABLE 8

Voltage-maintaining performance before and after the irradiation test

| Retention time Irradiation | 16.7 msec | | | 167 msec | | |
|---|---|---|---|---|---|---|
| period | 0 hr | 80 hr | 160 hr | 0 hr | 80 hr | 160 hr |
| Example 8 | 99% | 99% | 99% | 99% | 98% | 96% |
| Example 9 | 99% | 99% | 99% | 99% | 98% | 96% |
| Comparative Example 1 | 99% | 98% | 96% | 99% | 94% | 88% |

TABLE 9

Voltage-maintaining performance before and after the irradiation test

| Retention time | 167 msec | | | |
|---|---|---|---|---|
| Irradiation period | 0 hr | 120 hr | 200 hr | 360 hr |
| Example 10 | 99% | 95% | 94% | 88% |
| Example 11 | 99% | 96% | 94% | 88% |

As described in the foregoing, the present invention provides a guest host mode liquid crystal composition having azo type dichroic dyes having high dichroism or order parameter incorporated, whereby it is possible to realize a guest host mode liquid crystal device having an excellent contrast characteristic and light stability.

What is claimed is:

1. A guest host mode liquid crystal composition consisting essentially of dichroic dyes and host liquid crystal, wherein said dichroic dyes are at least one member selected from each of the following groups (A), (B) and (C):

Group (A) consisting of azo dichroic dyes of the following formula (I):

wherein each of $R^1$ and $R^2$ which are independent of each other, is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent;

Group (B) consisting of azo dichroic dyes of the following formula (II):

wherein n is 0 or 1, $R^3$ is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent, and each of $R^4$ and $R^5$ which are independent of each other, is a hydrogen atom, a $C_{1-10}$ alkyl, alkoxy or halogenated alkyl group, a $C_{2-12}$ alkoxyalkyl group, a halogen atom, or a benzyl or cyclohexylmethyl group which may be substituted by an alkyl group, an alkoxy group, an alkoxyalkyl group or a halogen atom; and Group (C) consisting of anthraquinone dichroic dyes of the following formula (III):

wherein each of $R^6$ and $R^7$ which are independent of each other, is a hydrogen atom, a halogen atom, a $C_{1-10}$ alkyl or alkoxy group, a $C_{2-12}$ alkoxyalkyl group, or a cyclohexyl or phenyl group which may have such a halogen atom or an alkyl, alkoxy or alkoxyalkyl group, as a substituent.

2. The guest host mode liquid crystal composition according to claim 1, which contains at least one dye of the formula (II) wherein n is 0.

3. The guest host mode liquid crystal composition according to claim 1, wherein the dyes of groups (A), (B) and (C) are in amounts of from 0.02 to 2.7 wt % of the dye of group (A), from 0.02 to 2.7 wt % of the dye of group (B) and from 0.06 to 9.6 wt % of the dye of group (C), based on the host liquid crystal.

4. The guest host mode liquid crystal composition according to claim 1, wherein the total content of the dichroic dyes is from 0.1 to 15 wt %, based on the host liquid crystal.

5. A guest host mode liquid crystal composition consisting essentially of dichroic dyes and host liquid crystal, wherein said dichroic dyes are at least one member selected from each of the following groups (A), (B), (C) and (D):

Group (A) consisting of azo dichroic dyes of the following formula (I):

wherein each of $R^1$ and $R^2$ which are independent of each other, is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent;

Group (B) consisting of azo dichroic dyes of the following formula (II):

wherein n is 0 or 1, $R^3$ is a hydrogen atom, a $C_{1-10}$ alkyl or alkoxy group, a $C_{2-12}$ alkoxyalkyl group, a halogen atom, or a cyclohexyl, phenyl, benzyl or cyclohexylmethyl group which may have such an alkyl, alkoxy or alkoxyalkyl group or a halogen atom, as a substituent, and each of $R^4$ and $R^5$ which are independent of each other, is a hydrogen atom a $C_{1-10}$ alkyl, alkoxy or halogenated alkyl group, a $C_{2-12}$ alkoxyalkyl group, a halogen atom, or a benzyl or cyclohexylmethyl group which may be substituted by an alkyl group, an alkoxy group, an alkoxyalkyl group or a halogen atom;

Group (C) consisting of anthraquinone dichroic dyes of the following formula (III):

wherein each of $R^6$ and $R^7$ which are independent of each other, is a hydrogen atom, a halogen atom, a $C_{1-10}$ alkyl or alkoxy group, a $C_{2-12}$ alkoxyalkyl group, or a cyclohexyl or phenyl group which may have such a halogen atom or an alkyl, alkoxy or alkoxyalkyl group, as a substituent; and Group (D) consisting of anthraquinone dichroic dyes of the following formula (IV):

wherein each of $R^8$ and $R^9$ which are independent of each other, is a hydrogen atom, a halogen atom, a $C_{1-10}$ alkyl or alkoxy group, a $C_{2-12}$ alkoxyalkyl group, or a cyclohexyl or phenyl group which may have such a halogen atom or an alkyl, alkoxy or alkoxyalkyl group, as a substituent.

6. The guest host mode liquid crystal composition according to claim 5, wherein the dyes of groups (A), (B), (C) and (D) are in amounts of from 0.01 to 1.8 wt % of the dye of group (A), from 0.01 to 1.3 wt % of the dye of group (B), from 0.05 to 7.7 wt % of the dye of group (C), and from 0.03 to 4.2 wt % of the dye of group (D), based on the host liquid crystal.

7. The guest host mode liquid crystal composition according to claim 5, wherein the total content of the dichroic dyes is from 0.1 to 15 wt %, based on the host liquid crystal.

8. The guest host mode liquid crystal composition according to claim 1, wherein the host liquid crystal is a fluorine-type liquid crystal material.

9. The guest host mode liquid crystal composition according to claim 5, wherein the host liquid crystal is a fluorine-type liquid crystal material.

10. A liquid crystal display device having the liquid crystal composition as defined in claim 1 interposed between a pair of electrode substrates, at least one of which is transparent.

11. A liquid crystal display device having the liquid crystal composition as defined in claim 5 interposed between a pair of electrode substrates, at least one of which is transparent.

* * * * *